United States Patent
Shah et al.

(10) Patent No.: US 11,627,618 B2
(45) Date of Patent: Apr. 11, 2023

(54) NETWORK-BASED RSI/PRACH PARAMETER PLANNING AND NEIGHBOR CREATION

(71) Applicant: T-Mobile USA, Inc., Bellevue, WA (US)

(72) Inventors: Sejal Vijaykumar Shah, Bothell, WA (US); Bhagwan Singh Khanka, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 176 days.

(21) Appl. No.: 16/841,166

(22) Filed: Apr. 6, 2020

(65) Prior Publication Data

US 2021/0315035 A1    Oct. 7, 2021

(51) Int. Cl.
| | | |
|---|---|---|
| *H04W 4/00* | (2018.01) | |
| *H04W 76/15* | (2018.01) | |
| *H04W 48/16* | (2009.01) | |
| *H04W 72/00* | (2023.01) | |
| *H04W 76/11* | (2018.01) | |

(52) U.S. Cl.
CPC ........... *H04W 76/15* (2018.02); *H04W 48/16* (2013.01); *H04W 72/005* (2013.01); *H04W 76/11* (2018.02)

(58) Field of Classification Search
CPC ........... H04W 72/0446; H04W 74/006; H04W 74/0833; H04W 72/005; H04W 74/00
See application file for complete search history.

(56) References Cited

U.S. PATENT DOCUMENTS

| | | | | |
|---|---|---|---|---|
| 8,873,508 | B1* | 10/2014 | Oroskar | H04W 72/04 455/442 |
| 2003/0210149 | A1* | 11/2003 | Reisman | G08B 21/22 340/568.2 |
| 2014/0274079 | A1* | 9/2014 | Li | H04L 5/0048 455/450 |
| 2021/0385879 | A1* | 12/2021 | Mahalingam | H04W 72/1263 |

* cited by examiner

Primary Examiner — Omoniyi Obayanju
(74) Attorney, Agent, or Firm — Loeb & Loeb LLP (57) ABSTRACT

A system uses signals received from actual user equipment (UE) to build in real time a reception pattern for base stations in a cellular communication system. Each UE is assigned a unique tone to broadcast so that a controller can analyze radio coverage by analyzing which base stations received signals from each UE in a coverage area. Cellular base stations necessarily have overlapping coverage and are assigned unique channel access values to avoid repeating values from overlapping cell sites. As overlaps change in real time, in response to live events, traffic jams, site outages, and new sites, signals received from UEs in the coverage area provide a real time view of system coverage. This allows better allocation of channel access values than prior art historical performance indicators using base station and controller call errors.

14 Claims, 8 Drawing Sheets

NETWORK-BASED RSI/PRACH PARAMETER PLANNING AND NEIGHBOR CREATION

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a cellular system, user equipment (cellular phones, IoT devices, etc.) contacts an individual cell site using a preamble (RSI) over a physical random access channel (PRACH). The RSI is picked at random by the user equipment using a selection of RSI values associated with the site in conjunction with other parameters. Engineers assign the RSI values based on an analysis of multiple historical connection data and failure data for collected at both the current site and nearby sites. These assignments are static and maintained intact until it is decided by system engineers to update the RSI parameters for one or more cell sites.

SUMMARY

An architecture involving both user equipment, sites, and node controllers (e.g., eNodeB) uses unique signals (or tones) broadcast from a plurality of user devices (UEs). Each cell site receives the unique tones from all in-range UEs and records not only the reception of the signal but also the signal strength for each. This real-time data may then be used to calculate RSI values for each cell site according to current conditions as opposed to the prior art scenario that uses only historical data for the creation of static RSI values.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Cellular communication systems assign a number of preambles, in some architectures a root sequence index (RSI) that is used in establishing communication between a mobile device or user equipment (UE) and a nearby cell site. An individual cell site may have assigned a set of 64 preambles that are utilized by user equipment (UE) to select a random access channel for that cell site. A UE uses the random access channel (RACH) to contact a cell site to begin initial communication between the UE and the cell site. The cell site also referred to as a base station will then assign the UE to a data channel for actual voice or data communication between the UE and the site.

As one familiar with cellular systems may recall, each cell site overlaps with another cell site so that UE traveling through a region may transfer from one cell to the next in a seamless manner. It follows then, that is adjacent cell sites have the same preambles, a UE may end up selecting a random access channel common to overlapping cell sites resulting in more than one cell site thinking it has control of future communication with that UE. This dual control may eventually cause an error as terrestrial lines and other control mechanisms are duplicated for the UE. In most cases, the call is dropped. This situation is referred to as an RSI collision.

System engineers go to great lengths to ensure that adjacent cell sites to do not duplicate these preamble values. (For the purpose of this disclosure, preamble values, RSI, or other architecture-specific names for these values will be referred to as channel access values.) In older architectures, a cell site may cover a 10 km area, depending on geography, sometimes as much as 20 km. However, as the number of cell sites increase to accommodate more user equipment, the overlap between cell sites and the number of cells that overlap a given site may also increase. This may be exaggerated in new 5G systems where cell sites may be designed to cover 1 km or even less. Correspondingly, user equipment at its highest power level may be able to access a significantly higher number of cell sites than before. To complicate matters further, current cellular system architectures have a limited number of channel access values so that ensuring that each site has channel access values that are not duplicated in adjacent/overlapping cells can become problematic.

The current state of the art requires that system engineers evaluate myriads of historical data such as several days' worth of key performance indicators (KPIs) such as random access setup success rate, call setup success rate, evolved radio access bearer drop rate, or intra-LTE handover success rate, among others. These KPIs are then used to assign relatively static channel access values to each cell site. These channel access values may be in use for up to several days or more before the KPIs are manually re-evaluated and new values assigned.

However, there are several real time situations that may rapidly affect KPIs for a coverage area. For example, a traffic jam or live event may cause a concentration of UEs in a particular area so that the closest cell sites are overwhelmed and UEs increase their power to reach more distant cell sites. Similarly, a cell site may experience a failure so that UEs are forced to search farther for coverage. As the UEs range increase, the number of sites that are now "adjacent" may increase dramatically so that errors due to duplicate channel access values become more common. Similarly, as new cell sites are installed and brought online, adjacencies must also be re-evaluated to allow the new site to avoid duplication of channel access values. Current systems have no mechanism for identifying and updating channel access values for any of these situations.

A system and method in accordance with the current disclosure allows real time evaluation of adjacencies not by using historical KPIs, but rather by enlisting user equipment in an area to build a real time coverage "map" of a region. Signals from all or a significant number of user devices may be used to determine adjacencies and to automatically recalculate channel access values for a region, as is discussed and described in more detail below. This real time mapping allows for an immediate reaction to the situations described above including traffic jams, large events, new sites, and site outages.

Figure 1:
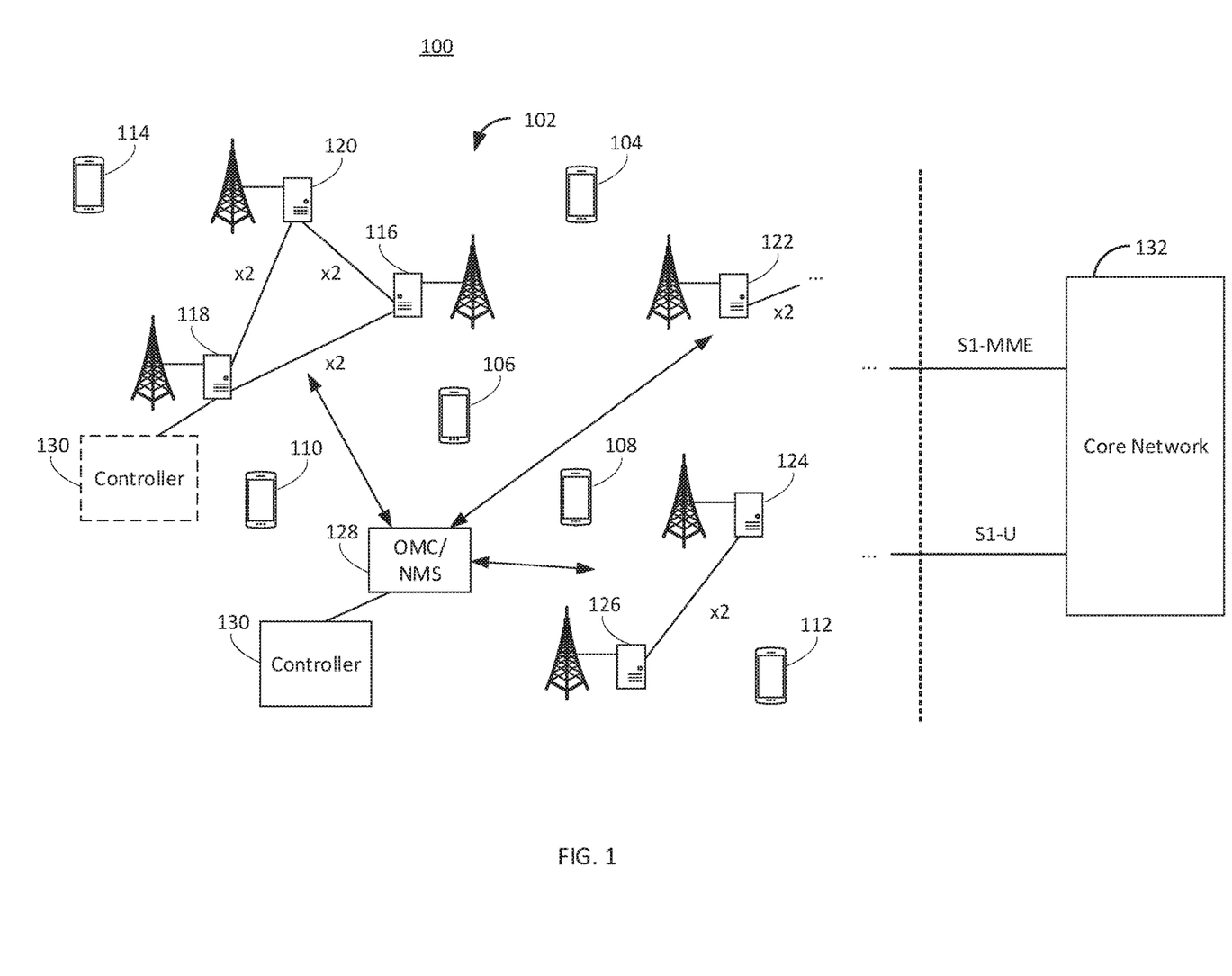
FIG. 1 is a simplified and exemplary block diagram of a cellular communication system in accordance with the current disclosure.

FIG. 1 is a block diagram illustrating a cellular communication system 100 in accordance with the current disclosure. In the greatly simplified illustration of FIG. 1, a radio access network (RAN) 102 may be coupled to a core network 132 via one or more communication links that are well known in Long Term Evolution (LTE) systems specifically and 3GPP standards-based systems in general. Because the current disclosure is focused around the RAN 102, this portion is shown in more detail. In this simplified and exemplary illustration, a plurality of base stations, also known as cell sites or eNodeB (or eNB) may include base stations 116, 118, 120, 122, 124, 126. Certain grouping of base stations in a market may be connected, in the LTE example, by an X2 interface. The base stations support communication with a plurality of user equipment devices (UEs) 104, 106, 108, 110, 112, 114. An Operations and Maintenance Center (OMC) 128 may communicate with the base stations in conjunction with the core network 132 to manage both management of the plurality of UEs (registration, handoffs, etc.) and user data (voice and data communication).

A controller 130 may be coupled to the OMC 128. The controller 130 may coordinate the polling and reconciliation of return signals from UEs used to generate the real time coverage map or reception patterns as well as selection of channel access values for the base stations. The functions of the controller 130 are discussed in more detail below. In an embodiment, the functions of the controller 130 may be layered onto an eNodeb or other base station, as shown in dashed lines in FIG. 1.

Figure 2:
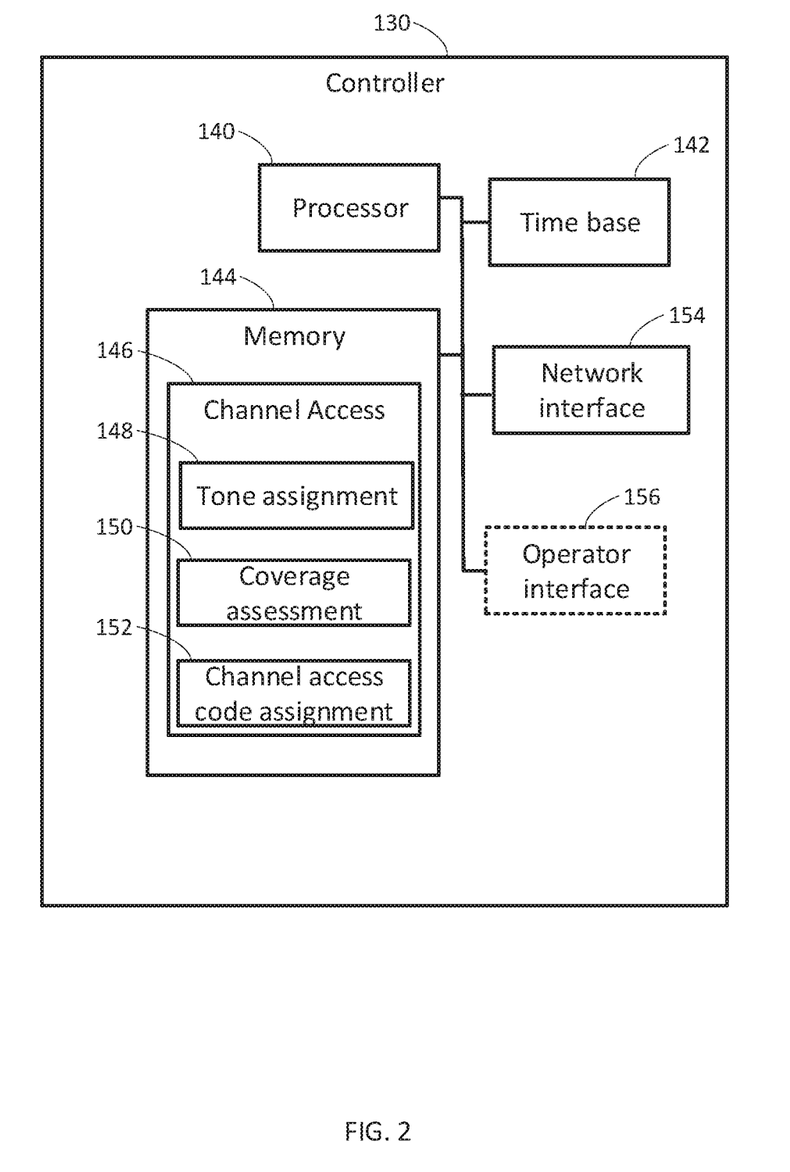
FIG. 2 is a block diagram illustrating a first environment for the cellular communication system of FIG. 1.

FIG. 2 is a block diagram of a simplified and exemplary controller 130. The controller may include a processor 140 and a time base 142 used for signaling coordination. The controller 130 may also include a memory 144 storing, among other things, data and executable modules used in evaluating and assigning RSI or other channel assignment values. Channel access data and code 146 may include a tone assignment module 148, a coverage assessment module 150, and a channel access code assignment data 152.

The tone assignment module 148 may use current information from the base stations 116, 118, 120, 122, 124, 126 to determine which UEs are available in the coverage area of interest and assign unique tones for each UE of interest. That is, while in some embodiments, every UE the coverage area may participate in the mapping exercise, in other embodiments, only a subset of all the devices may be used. For example, UEs may be selected by type so that only smart phones are used. In another example, UEs that have been involved in a handoff between sites in a recent time period may be selected. In yet another example, a cap may be put on the number of UEs selected for a given base station so that the base station isn't overwhelmed with tones when the response signals are sent. The tone assignment module 148 may then send a UE identifier, a tone value, and optionally, a time and a power level, to respective base stations currently in contact with the specified UEs. (While the term 'tone' is used throughout this document, the term in this field of art refers to a digital code and would not normally refer to an analog signal, although in some embodiments this may be possible.) The time may specify a specific time or time range over which each UE is to broadcast its respective unique tone. The power level may specify at which power level the UE is to broadcast the tone. In an example, the power level may be specified as the last power level used by the UE. In another example, the power level may be specified as the maximum power level available. Of course, other power levels can be specified based on conditions and the goals of the survey process.

The generation of unique tones or digital codes may be accomplished, in one embodiment, using a random number generator. In another embodiment, an algorithm may generate tones in a manner to maximize the distance between tones given the quantity of tones to be generated. For example, algorithms exist that create a desired Hamming distance between codes.

The coverage assessment module 150 may receive tone values, UE identifiers, and base station identifiers for all tones received at each of the base stations 116, 118, 120, 122, 124, 126. The module 150 may build a table of what tones were received at what base stations. When one tone is received at two or more base stations, the inference can be made that those base stations are providing overlapping coverage to the UE or UEs from which the tone or tones are received. This objective survey of overlapping coverages is accurate to the time at which the tones are received and includes dynamic changes such as crowds, site outages, and new sites.

The channel access code assignment module 152 may use the results of the coverage survey to build a table of channel assignments for each base station 116, 118, 120, 122, 124, 126 so that known overlapping base stations are not given duplicate channel assignment values. Any of several algorithms may be used in this process, such as those used in color assignments for maps.

The controller 130 may also include a network interface 154 for communication with, among other system entities, the plurality of base stations 116, 118, 120, 122, 124, 126. In some embodiments, the controller 130 may include an operator interface 156 that allows an operator to locally set and monitor the survey and assignment processes. In other embodiments, the controller 130 may be operated remotely from another control environment.

Figure 3:
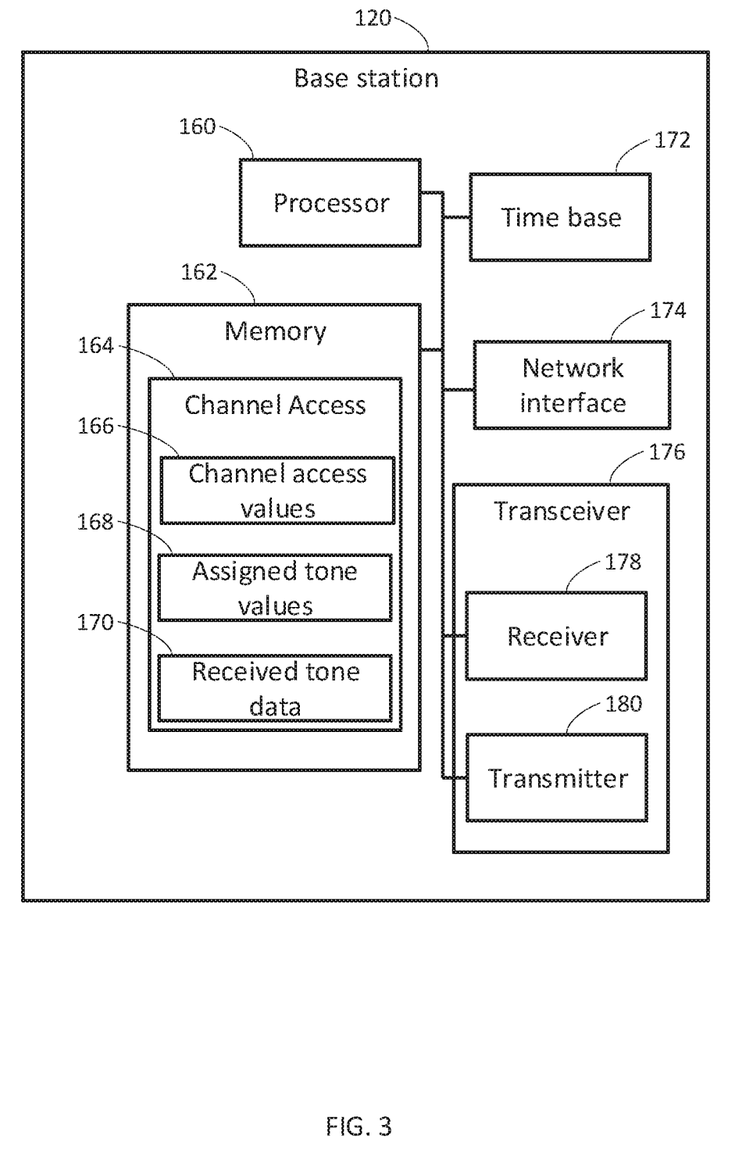
FIG. 3 is a simplified and exemplary block diagram of a base station in accordance with the current disclosure.

FIG. 3 is a block diagram of a simplified and exemplary base station 120 that may be typical of any of the plurality of base stations 116, 118, 120, 122, 124, 126 used in the illustrated embodiments. The base station 120 may include a processor 160 and memory 162 that stores both executable instructions and data. Among the information stored in the memory 162 may be a memory 164 storing code and data related to channel access values relevant to the current disclosure. Channel access values 166 may be those values currently in use by the base station. These values, such as RSI values may be transmitted to UE as they become affiliated with the base station via, for example, a system information block (SIB) or more specifically a SIB2 block.

The memory 164 may also store assigned tone values 168. These are tones received from the controller 130 that are to be transmitted to all or selected of the UEs currently in communication with the base station 120. The tones are unique to each UE and are broadcast by each UE when the coverage survey is initiated.

After the UEs each broadcast their respective tones, each base station 116, 118, 120, 122, 124, 126 will receive tones from as many UEs as are in broadcast range of that UE. The data for tones received at a particular base station, such as base station 120 may be stored in the memory 162. Received tone data 170 may include the tone value and/or the UE identifier, such as IMEI, as well as a signal strength indicator. In some embodiments, location data about the UE may also be stored with received tone data. The location data may be received from the UE itself, such as a GPS coordinate, or may be generated by the network infrastructure using, for example, signal strength or triangulation.

A time base 172 may be used for synchronization of network events, such as cell-to-cell handoffs. The time base 172 may also be used for coordinating and recording UE tone broadcasts for use in generating the system coverage map or system reception pattern. A network interface 174 may support data communications with the controller 130 as well as X2 interface communication between base stations and system management messages as defined by relevant standards.

The base station 120 may include a transceiver 176 or in some embodiments, multiple transceivers. The transceiver 176 may include at least one receiver 178 and at least one transmitter 180. The transceiver 176 is used for wireless communication with one or more UEs 114. The transceiver 176 and its associated antennas may be capable of sophisticated functions including beam forming that allows antenna gain to be steered toward a particular UE.

Figure 4:
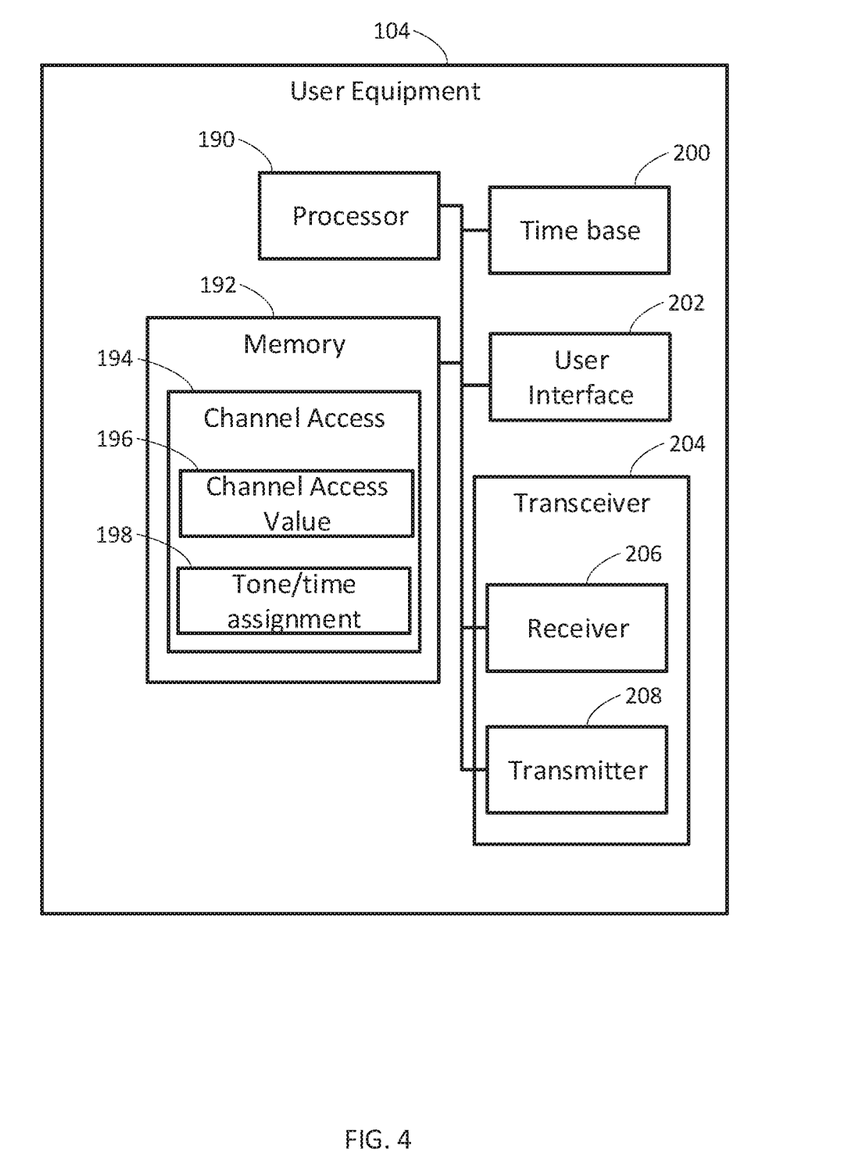
FIG. 4 is a simplified and exemplary block diagram of a user equipment device (UE) in accordance with the current disclosure.

An exemplary and representative user equipment device (UE) 104 may be depicted in the block diagram of FIG. 4. The UE 104 may include a processor 190 and memory 192 that stores executable code and data. The memory 192 may particularly include channel access memory 194 that may include code and data related to the UE's participation in generating a real time system reception pattern or coverage map. These data may include a channel access value memory 196 and a tone memory 198. The channel access memory 196 may include RSI or similar values that are downloaded from a base station providing current coverage, for example, base station 120 and used in selection of a random access channel. The tone memory 198 may store a tone value assigned by the controller 130 and received from the current base station. The assigned tone value, as discussed above, may be unique for this UE among all the UEs in the coverage area, or at least unique among those participating in the coverage map/reception pattern. The tone memory 198 may also store other information relevant or useful in generating the coverage map. For example, the tone memory 198 may include a time at which to broadcast the tone. The time may be the same across all UEs 104, 106, 108, 110, 112, 114 or each UE may be assigned a separate time with a slight offset from other UEs to accommodate the reception of the tones are the various base stations. The tone memory 198 may also in a power lever setting which the UE is to use for broadcasting its tone. The power level may be based on current power level settings maintained by the base stations or may be selected using a heuristic. In an embodiment, the tone may be rebroadcast at successively increasing or decreasing power levels until a metric is reached. For example, the controller 130 may designate a low power level to begin and increase the power level until responses are recorded for each mobile unit from which a response was expected or at least a statistically significant portion of the available UEs.

The UE 104 may also include a time base 200 used, in part, for synchronizing activities such as base station handoffs, but may also be used in conjunction with a specified time in the tone memory 198 to set a time for broadcasting the tone. The UE 104 may also include a user interface 202 as is known in the art and that may include a touchscreen, display, and buttons (not depicted).

The UE 104 may also include a transceiver 204 used for communication with the current base station and may include a receiver 206 and transmitter 208. The UE 104 may also include other wireless communication devices (not depicted) such as, but not limited to, an 802.11 (WiFi) radio, Bluetooth radio, near-field communication (NFC) radio, or even an optical transmitter.

Figure 5:
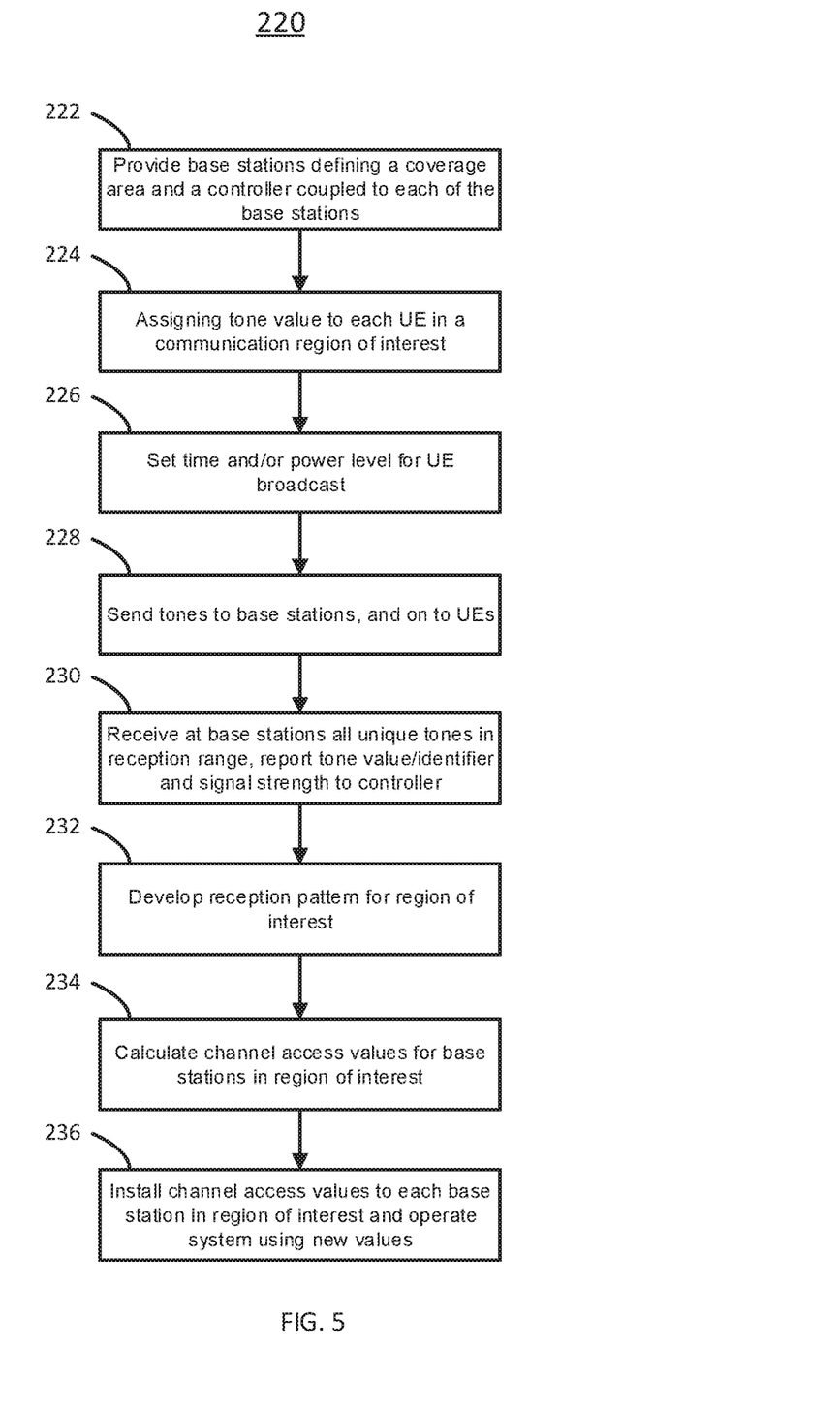
FIG. 5 is a flowchart of a method operating a cellular communication system.
Figure 6:
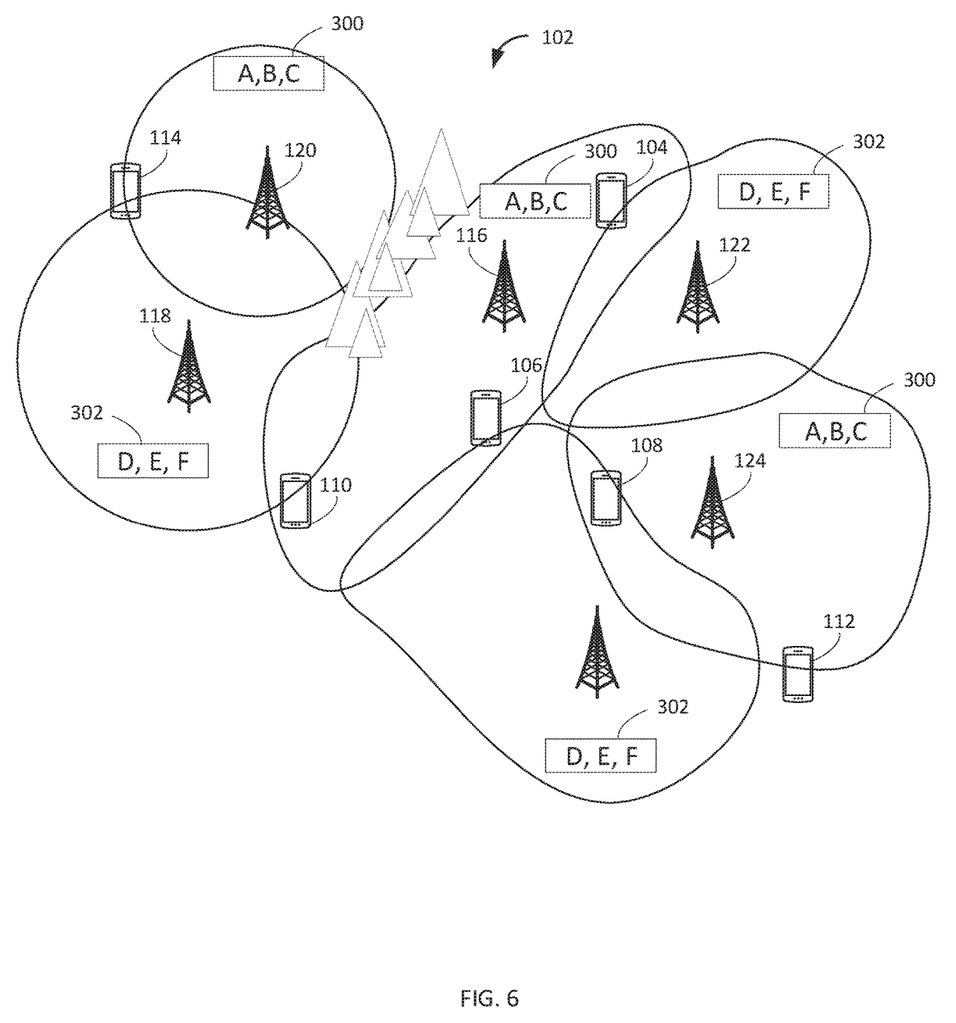
FIG. 6 is a block diagram illustrating a first operating environment for the cellular communication system of FIG. 1.
Figure 7:
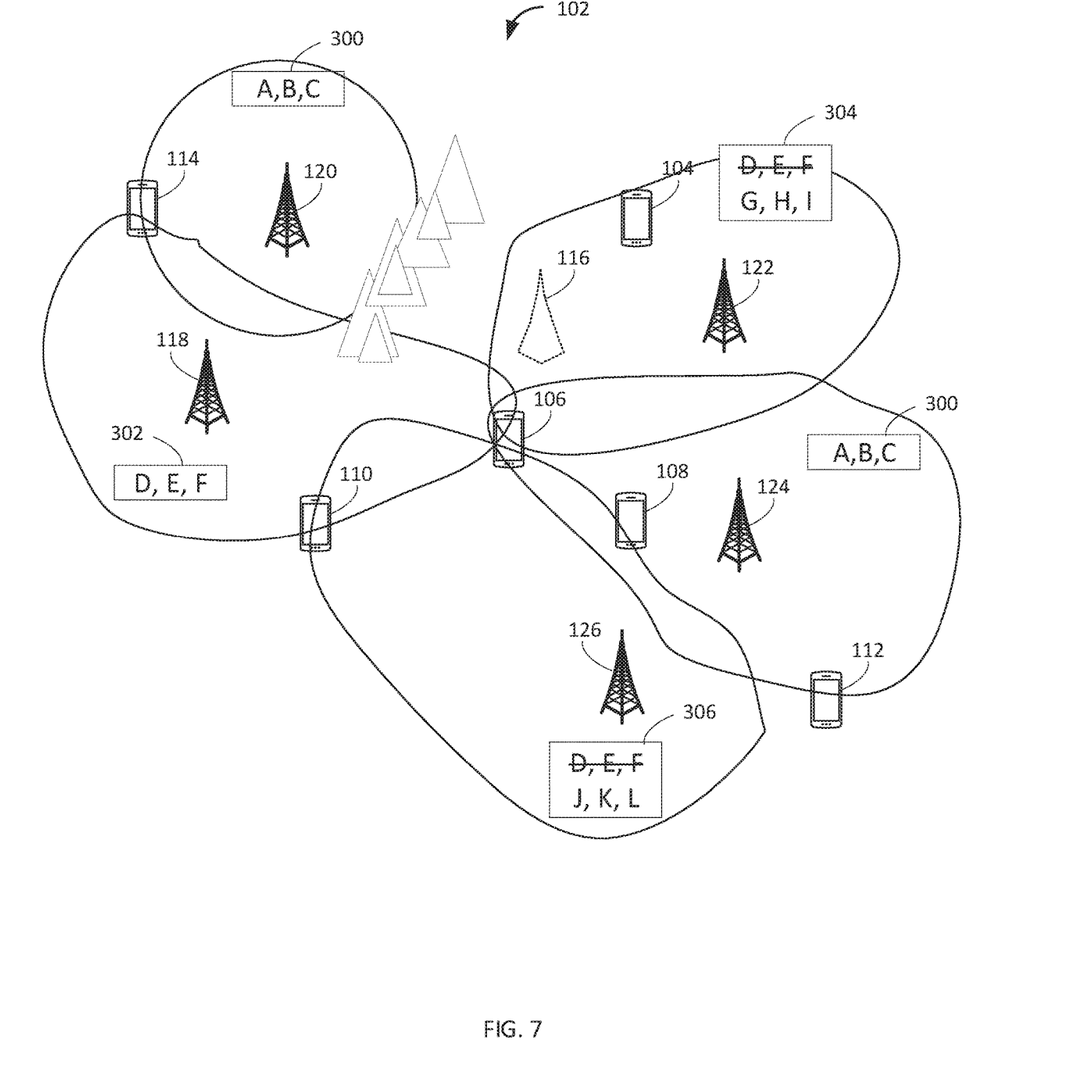
FIG. 7 is a block diagram illustrating a second operating environment for the cellular communication system of FIG. 1.
Figure 8:
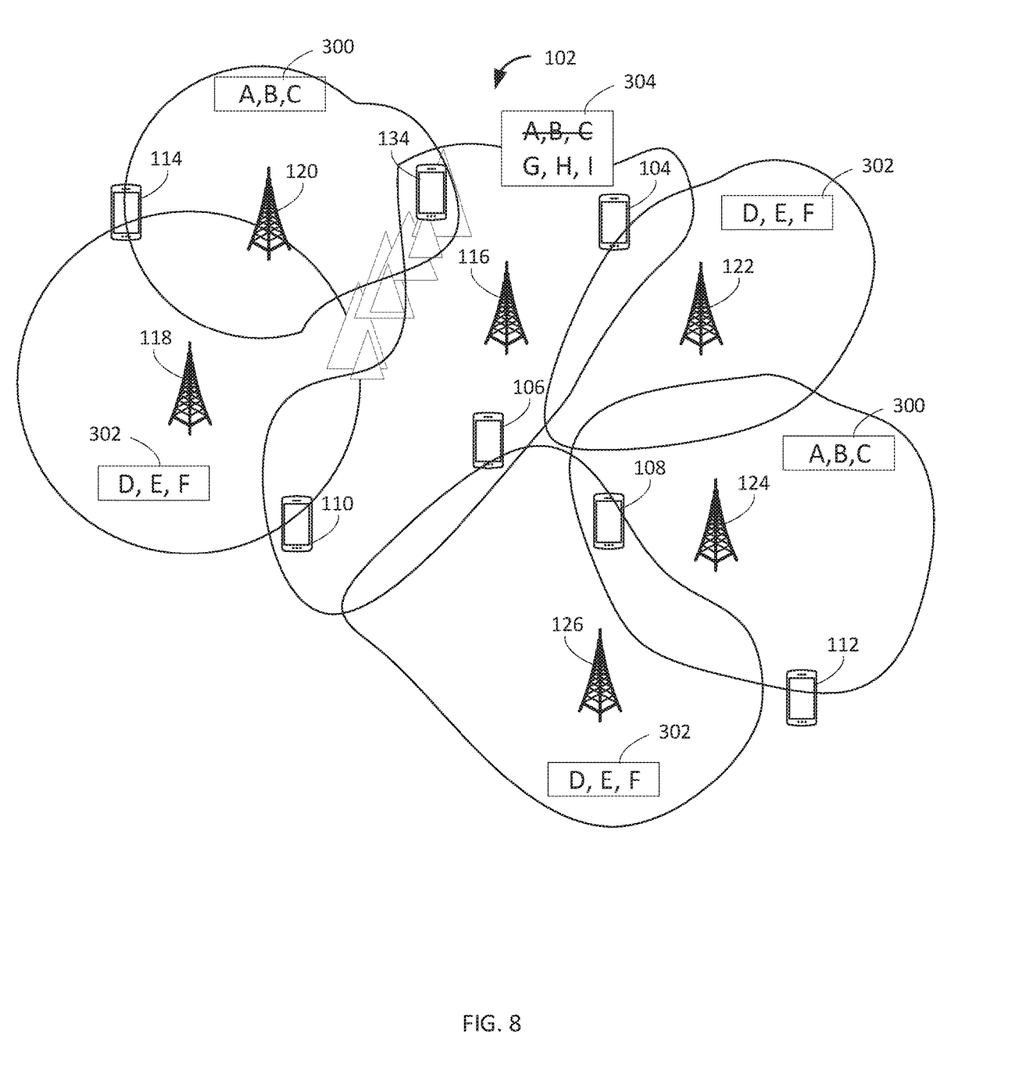
FIG. 8 is a block diagram illustrating a third operating environment for the cellular communication system of FIG. 1.

Before discussing the flowchart of FIG. 5, a brief explanation of the physical and logical environment for the exemplary system of FIG. 1 is discussed and described in FIGS. 6-8. Of course, the illustrations of FIGS. 1, 6, 7, and 8 are greatly simplified for the sake of illustration as well as simplification of the channel access values to three alpha characters. In a particular cellular system market there may be over 1000 base stations with an average of three sectors per base station. Each base station (eNodeB) may have up to 20 neighbors. In a perfectly configured system, each sector of each base station will have a non-overlapping RSI values. As currently defined, root sequence indexes may built from a table with 838 bit Zadoff-Chu sequences having known phase differences between symbols. Random channel selection by the UE may use a configuration index parameter found in a particular frame and sub-frame of a SIB2 packet to determine a cyclic shift to apply to the RSI. In general, the system is complex, there are a limited number of RSI (channel access) values, and these values must be reused in a cellular system market. Therefore, the simplifications made in the of exemplary systems discussed here are made for the sake of illustration of the disclosed concepts without clouding by extraordinary system detail. A person of ordinary skill in current cellular system architectures will readily understand the concepts and applications disclosed herein and their application to channel access value assignment.

Referring to FIG. 6, each base station may provide radio coverage for an individual coverage area associated with that base station. As is known, each coverage area may include an overlapping region with one or more adjacent base stations so that UEs traversing a region may transfer a call or data session from one base station to another as a UE moves from one coverage area to the next. Each base station is shown in FIG. 6 with a respective coverage area an exemplary channel access value set. For example, base station 120 has channel access value set 300 (A, B, and C) while base station 118 is illustrated with channel access value set 302 (D, E, F). It is important that these two overlapping coverage areas do not share channel access values because, as discussed above, confusion between which base station is actually managing a particular UE, such as UE 114 in this case, can cause system errors and dropped calls. Hilly terrain between base stations 116 and 120 allow, in some circumstances, channel access values to be reused between these two sites.

FIGS. 7 and 8 illustrate system changes that may cause adjacencies to change and which in a system practicing the current state of the art will create system errors until manually evaluated and corresponding channel access values are reassigned.

FIG. 7 illustrates a scenario where base station 116 goes offline. In this case, compared to that of FIG. 6, three UEs, 104, 106, and 110 may need to attach to new base stations to get into coverage. This may be accomplished through increasing their transmit power to span a greater distance. For this example, UE 106 may now be in range of four base stations where overlapping cover did not necessarily occur before. A system in accordance with the current disclosure can discover that a configuration change may be required through several indicators, including but not limited to, observing that base station 116 is down, an increase in system errors, or simply that routine coverage polling is performed on a regular basis, such as every five minutes.

The controller 130 may assign tones to the existing UEs and cause the UEs to broadcast their tones immediately or at a specified time and/or at a specified power level, as discussed above. Each base station 118, 120, 122, 124, 126 may report the tones and/or UE identifier of all UEs from which a tone is received. While in some embodiments the controller 130 may build an actual coverage map showing base station signal ranges, in other embodiments it may be enough to simply note which base stations are now experiencing adjacencies via receiving tones from one or more of the same UEs. Once the adjacencies are determined, more or less in real time from when the UE signals are broadcast, the controller 130 may algorithmically reassign channel access values to base stations as needed. In the example shown in FIG. 7 base stations 120, 118 and 124 to not require reassignment, while base station 122 receives a new channel access value set 304 (G, H, I) and base station 126 is assigned channel access value set 306 (J, K, L).

FIG. 8 illustrates another exemplary situation involving real time channel reassignment. In this illustration, hikers represented by UE 134 on the mountain range that separates base station 116 from base station 120 now create an environment where one mobile device (or more) may create an adjacency between the two cell sites, 116 and 120. Causing the UEs to broadcast unique tones will allow the controller 130 to determine that the two usually separate sites are now experiencing an adjacency. The controller 130 may then change the channel access values for base station 116 to set 304 (G, H, I). These examples in FIGS. 7 and 8 illustrate but two of many different scenarios where real time polling of UEs may allow the controller 130 to generate a fresh coverage map or reception pattern of an area so that channel access values may assigned in real time to respond to changes in condition.

FIG. 5 is a flowchart of a method 220 of operating a cellular communication system. At block 222, a plurality of base stations 116, 118, 120, 122, 124, 126 may be provided. A controller 130 may be coupled each of the base stations.

At block 224, the controller 130 may assign a tone or code to each user equipment device (UE) 104, 106, 108, 110, 112, 114 in a communication region of interest, such as an area for which radio coverage is provided by the plurality of base stations 116, 118, 120, 122, 124, 126. The tone value may be unique to each UE.

At block 226, optionally, the controller 130 may add a power level and time may also be added to the unique tones for each UE. Each of the plurality of base stations 116, 118, 120, 122, 124, 126 may receive, from the controller 130, one or more tone values and optionally time and/or power levels at block 228. In an embodiment, the controller 130 may send the tone values and optional data only to the base station that is current in communication with a particular UE 104. In another embodiment, each base station may receive the tone and optional data for all UEs in the coverage area. The base station 116 may then determine which UEs it should send the tone values to. The latter scenario increases the data traffic and local processing but may help ensure that all desired UEs receive the tone and optional data even when a handoff to another cell has just occurred or is imminent.

At block 230, the UEs may broadcast their respective unique tone values which may be collected by one or more base stations 116, 118, 120, 122, 124, 126 whether that base station is current controlling a given UE or not. That is, the tone from one UE may be received by multiple base stations. All base stations may record the signal strength of the tone as well as the tone, a tone identifier and/or an identifier of the UE itself. This information may be forwarded to the controller 130.

The controller 130, at block 232, may develop a coverage map or overlap list for the plurality of base stations 116, 118, 120, 122, 124, 126 based on which base stations receive tones from the same UE. Specifically, if two or more base stations receive a tone from the same UE, it can be assumed that these base stations are providing overlapping coverage. Once the coverage/overlaps are determined, the controller may calculate, at block 234, channel access values for each base station that ensure that overlapping base stations do not use the same values. These values may be forwarded to each base station 116, 118, 120, 122, 124, 126.

At block 236, the respective channel access values may be distributed by a base station to UEs that are attempting to register with that base station according to the system protocol, for example, via SIB2 messages.

At least one technical effect is the ability to use signals transmitted by user devices to build a real time coverage map or reception pattern for an installation of base stations in a cellular environment. This real time data reflects current system conditions by leveraging user devices to build signal strength and coverage in contrast to prior art systems that rely on historical key performance indicators (KPIs) of system performance taken at the base stations and controllers to optimize the system for configurations that may not even exist anymore.

The current system and method benefit both users and system operators by allowing real time data to be collected, analyzed and acted on as conditions change, not simply when system engineers have time to analyze performance data. This data that reflects was user equipment is actually experiencing for development of critical system settings increases system reliability for mobile device users and reduces costs and customer service issues for operators.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of operating a cellular communication system comprising:
   providing a plurality of base stations, the plurality of base stations defining a coverage area;
   providing a controller coupled each of the plurality of base stations in the coverage area;
   assigning tones from one or more user equipment devices (UEs), each tone uniquely identifying a corresponding one of the one or more UEs and comprising a digital code;
   in response to the assigning, transmitting a UE identifier, a tone value, and a time and a power level to the plurality of base stations in contact with the one or more UEs;
   collecting, at the controller, data from each base station corresponding to each individual tone received at each base station and a corresponding signal strength for each received tone;
   coordinating, at the controller, a polling and reconciliation of the collected data to generate a real time reception pattern;
   assigning channel access values to one or more of the plurality of base stations based on the reception pattern; and
   operating the one or more of the plurality of base stations using the assigned channel access values.

2. The method of claim 1, further comprising causing each of the UEs to broadcast its unique tone at a pre-determined signal strength.

3. The method of claim 2, further comprising causing each of the UEs to broadcast its unique tone at a set time.

4. The method of claim 3, further comprising assigning a tone value to each of the UEs in a communication region of interest.

5. The method of claim 1, further comprising assigning a tone value to each of the UEs in a communication region of interest.

6. The method of claim 1, further comprising sending the assigned channel access values from a respective one of the plurality of base stations to all UEs in the coverage area of the one of the plurality of base stations.

7. The method of claim 1, wherein the cellular communication system is a Long-term Evolution (LTE) communication system and the controller is incorporated into an eNodeB.

8. The method of claim 1, wherein the controller is a standalone component of the cellular communication system.

9. A method of operating a cellular communication system comprising:
   providing a controller coupled a plurality of base stations;
   assigning a unique tone to each of a plurality of user equipment devices (UEs), wherein the unique tone comprises a digital code;
   in response to the assigning, transmitting a UE identifier, a tone value, and a time and a power level to the plurality of base stations in contact with the each of the plurality of UEs;
   receiving, at the controller, data corresponding to an identity of each base station of the plurality of base stations that received a tone broadcast by one or more of the plurality of UEs, the data further including a corresponding signal strength and information used to identify a one of the plurality of UEs that sent the unique tone;
   coordinating, at the controller, a polling and reconciliation of the received data to generate a real time reception pattern
   for each of the plurality of base stations; and
   assigning, by the controller, site-specific channel access values to one or more of the plurality of base stations based on the reception pattern.

10. The method of claim 9, further comprising taking a survey of UEs in a coverage area defined by the plurality of base stations prior to assigning the unique tone to each of the plurality of UEs.

11. The method of claim 9, further comprising transmitting, from a UE of the plurality of UEs, its assigned unique tone, the UE incorporating a tone transmission function.

12. The method of claim 11, further comprising transmitting, from the UE of the plurality of UEs, its assigned unique tone at a predetermined power level.

13. The method of claim 11, further comprising transmitting, from the UE of the plurality of UEs, its assigned unique tone at a predetermined time.

14. The method of claim 9, wherein the site-specific channel access values are preamble values used by the UEs to select a random access channel in a fourth generation long term evolution (4G LTE) system.

* * * * *